July 19, 1949.  W. R. CUSTER  2,476,482
CHANNELED AIRPLANE WING AND
PROPULSION MEANS THEREFOR Filed Sept. 20, 1945  2 Sheets-Sheet 1

Willard R. Custer  INVENTOR.

BY Bernard F. Garvey
Attorney

July 19, 1949.  W. R. CUSTER  2,476,482
CHANNELED AIRPLANE WING AND
PROPULSION MEANS THEREFOR Filed Sept. 20, 1945  2 Sheets-Sheet 2

Willard R. Custer  INVENTOR

BY

Attorney

Patented July 19, 1949

2,476,482

UNITED STATES PATENT OFFICE 2,476,482

CHANNELED AIRPLANE WING AND PROPULSION MEANS THEREFOR

Willard R. Custer, Hagerstown, Md.

Application September 20, 1945, Serial No. 617,616

2 Claims. (Cl. 244—12)

This invention comprises a tailless airplane employing the Custer channel type wing.

It is within the contemplation of this improvement to use a fuselage without tail or empennage of any kind in conjunction with wings of substantially standard construction supplemented by channels contiguous to the sides of the fuselage.

The feasibility of flying conventional aircraft, without tail or empennage, through the use of channels or troughs, is taught in my application Serial Number 355,055, filed August 31, 1940, which issued as Patent No. 2,437,684 on March 16, 1948; and continued experiments have proven not only the feasibility but the superiority of airplanes so constructed. The salient objects of the present invention therefore are to correlate the abbreviated fuselage, channel type wings and propellers to obtain maximum overall efficiency; to so position the channels with respect to the wing surfaces that maximum lift results without increasing the factors of drag or resistance; to locate each propeller within its channel yet in such close proximity to its aft edge that the propeller disc is almost uniplanar with said edge; to provide a tailless airplane with wings each having a channel running in the direction of flight and opening upwardly resulting in a phenomenal increase in static lift as well as increase lift in flight; and to provide an airplane of standard construction, except as herein specifically modified, with reduced cost in manufacture and operation and with an increase of the speed range ratio.

I have also found from experiment that maximum results are obtained, especially in static lift, where the chord of the channel is less than one-half of the length of the propeller or as a corollary one-half the diameter of the propeller disc. Correspondingly, the effective chord area of the channel part of the wing is less than one-half of the propeller length and it is of the essence of importance that the propeller disc be in very close proximity to the aft or trailing edge of the channel part of the wing to prevent down pressure on the extreme aft end of the wing beyond the propeller disc. This permits air to flow from the channel uninterruptedly into the atmosphere. The increment in lift, due to angle of attack, is attributed to the vertical component of the thrust.

Other objects of the invention will be apparent from the following description of the preferred form of the invention wherein.

The device of the present invention includes the fuselage 4 which is devoid of tail structure or empennage and if desired the trailing edge may be streamlined to a point as indicated at 5. The body portion of the fuselage may be of standard construction and equipped with a cockpit of standard design.

Figure 1:
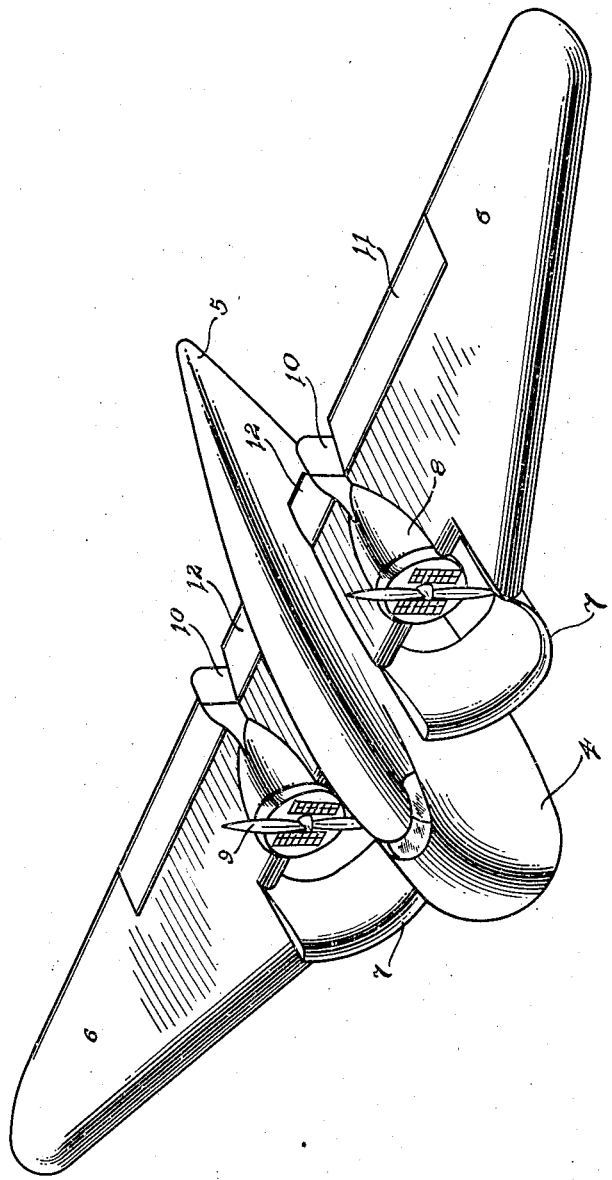
Figure 1 is a perspective view of an airplane constructed in accordance with the present invention.
Figure 2:
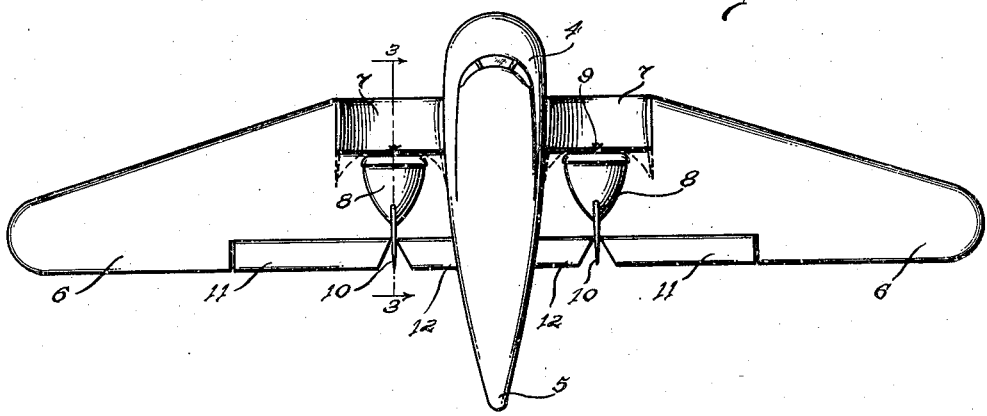
Figure 2 is a top plan view of the same.
Figure 3:
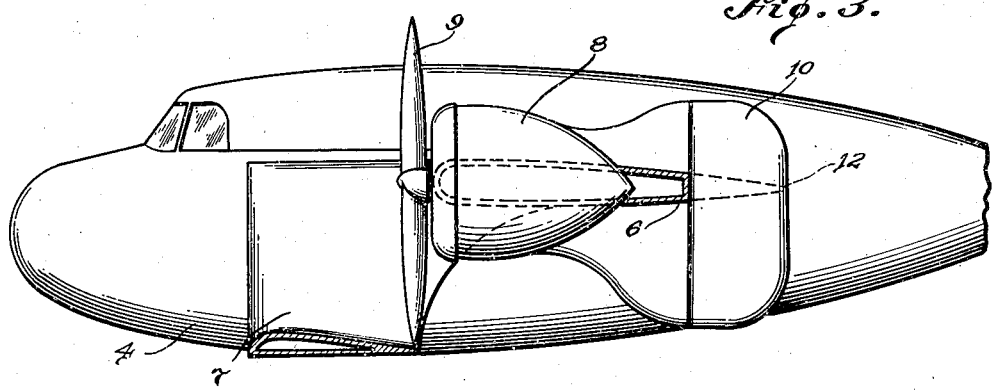
Figure 3 is a transverse sectional view taken on the line 3—3 of Figure 2 looking in the direction of the arrows.

Extending laterally from the opposite sides of the fuselage 4 are a pair of wings 6 each of which, as illustrated to advantage in Figure 1, preferably tapers toward its outer free terminal so as to provide a maximum chord at the root or point of juncture of the wing with the fuselage. At this point the forward or leading edge of each wing is provided with or is formed to provide a channel 7 which is of semi-circular configuration. If desired, the leading edge of the channel may merge into the leading edge of the wing proper or may be in advance of the latter. The inner wall of each channel is contiguous to and engaged with the outer wall of the fuselage 4.

The aft edge of each channel 7 is free except for the upper margin thereof which is connected to or may merge into the leading edge of the wing proper as also illustrated to advantage in Figure 1. By this construction and arrangement each of the channels 7 extends in the direction of flight, opens upwardly and permits the unobstructed passage of air through the channel and below the wings 6.

Each of the wings 6 carries an engine or other power means 8 to which is operatively connected a propeller 9 of standard construction. Each of the propellers is mounted on the front of its motor, and operates within a channel 7 in close proximity to the trailing edge of the latter. It is of importance in the present invention that the propeller be in very close proximity to the aft edge of the channel. Good results have been obtained where the propeller was located 0.5 inch ahead of the trailing edge of the channel.

The engines 8 may each be equipped with a rudder 10 and each of the wings may be equipped with an aileron 11 and elevator 12.

I have herein described a preferred embodiment of the invention which has been subjected to extensive private and governmental tests and has been found to increase the increment of static life considerably in excess of 50% and to also materially increase lift when in flight. It is to be understood that the channel portions of the wings may be in advance of or coincident with the leading edges of the wings and the free ends of each channel extends upwardly to a point just above the axis of its propeller as shown to advantage in Figure 4.

I am aware that various other changes may be made herein within the scope of the claims hereto appended.

What I claim is:

1. An aircraft comprising a fuselage, a wing member extending laterally therefrom, said wing member being formed with a recess extending rearwardly from the leading edge thereof, a channel member secured to and extending downwardly from said wing member and co-extensive with said recess, said channel member forming a forwardly, upwardly and rearwardly open channel, and a propeller mounted on said wing member at the aft edge of said recess, said propeller being so disposed that the propeller disc extends above and below the wing member and the lower portion of the periphery of the propeller disc substantially coincides with the aft edge of the channel member, whereby when the propeller rotates it will effect a flow of air rearwardly through said channel and above and below said wing member.

2. An aircraft comprising a wing provided with an opening extending rearwardly from its leading edge, a channel member secured to and extending downwardly from the wing and coextensive with said opening, said channel member being open forwardly, upwardly and rearwardly, and a propeller mounted on said wing at the aft edge of the wing opening, said propeller being so disposed that the propeller disc extends above and below the wing, the lower portion of the periphery of the propeller disc substantially coinciding with the aft edge of the channel member, whereby when the propeller rotates it will effect a flow of air rearwardly through said channel and above and below said wing member.

WILLARD R. CUSTER.

REFERENCES CITED

The following references are of record in the file of this patent:

UNITED STATES PATENTS

| Number | Name | Date |
| --- | --- | --- |
| 883,565 | Pars | Mar. 31, 1908 |
| 979,341 | Sargeant | Dec. 20, 1910 |
| 2,118,052 | Odor | May 24, 1938 |
| 2,194,596 | Henter | Mar. 26, 1940 |
| 2,376,862 | Bowen | May 29, 1945 |
| 2,397,526 | Bonbright | Apr. 2, 1946 |